Dec. 29, 1953 J. A. McINERNEY 2,664,098
JACKETED PRESSURE VESSEL
Filed April 23, 1949
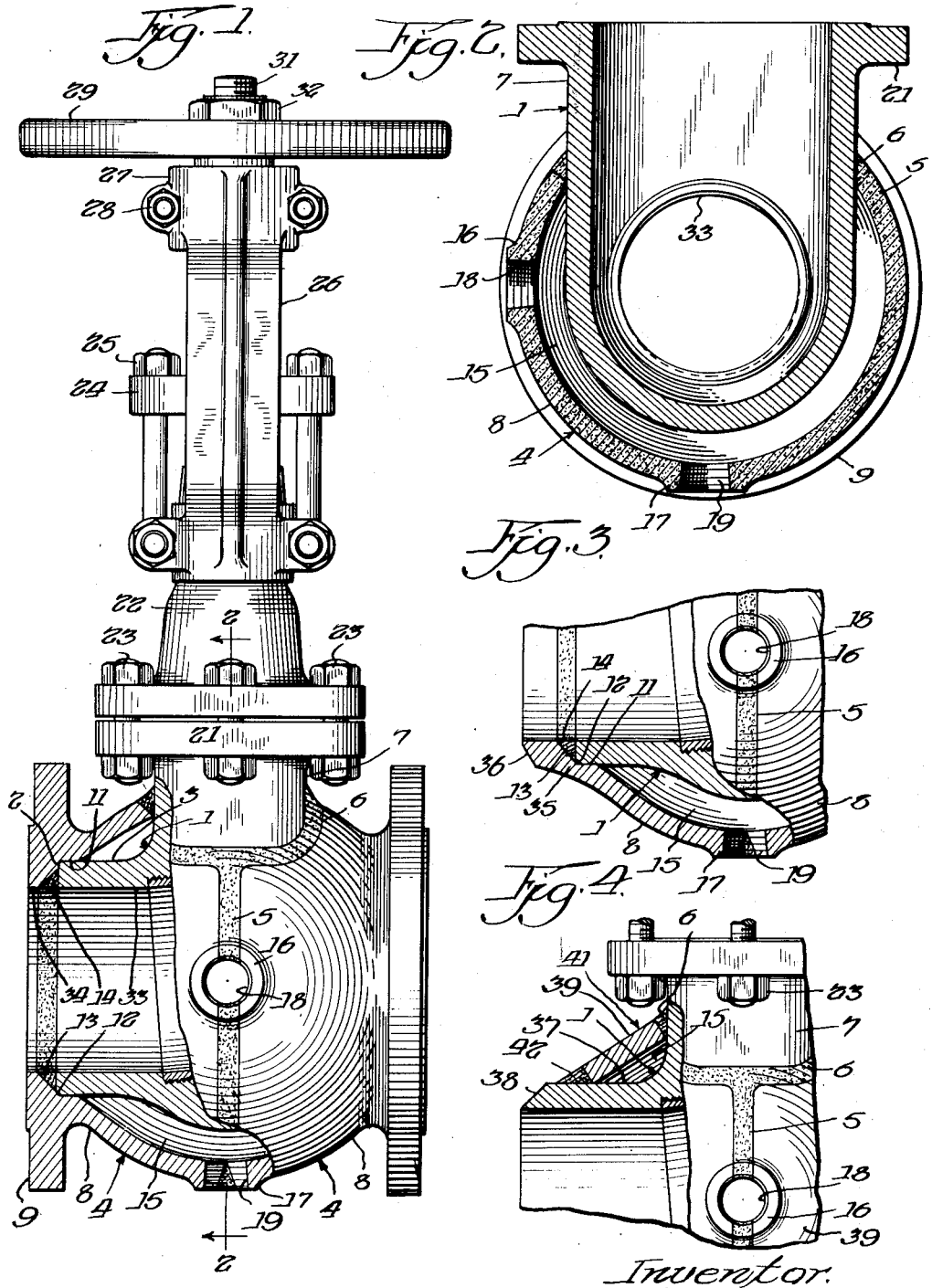
Inventor:
John A. McInerney
By Joseph O. Lange Atty.

Patented Dec. 29, 1953

2,664,098

UNITED STATES PATENT OFFICE 2,664,098

JACKETED PRESSURE VESSEL

John A. McInerney, Chicago, Ill., assignor to Crane Co., Chicago, Ill., a corporation of Illinois Application April 23, 1949, Serial No. 89,280

3 Claims. (Cl. 137—340)

This invention relates to a jacketed pressure vessel. More particularly, it is concerned with a unique type of construction in which the conventional valve body, for example, may be economically and efficiently provided with a water jacket or the like.

In order to obtain a better appreciation of the background of this invention, it should be realized at the outset that valves of the general type hereinafter referred to have been used in the past, employing either steam jackets, water jackets, or other forms of fluid-containing jackets, whereby the body is either heated or cooled as required by the service for which the valve is ultimately to be used. However, one of the more serious objections in the past to the earlier constructions of jacketed valves has been the inability or impracticability to properly support the valve body or other pressure casing being jacketed, so that frequently pipe line strains have been transmitted directly to the valve body causing distortion, and in some cases actual rupture of the body depending upon the nature and substance of the strains encountered.

Therefore, it is one of the more important objects of this invention to provide a jacketed valve in which the jacket itself preferably serves as the supporting means in the pipe line and forming the connection between the valve body and the pipe itself.

Another important object is to provide for a structure in which the assembly may be made quickly and economically by employment of such joint-making methods as welds, brazing, or other fluid sealing forms of attachment, without requiring special connections on the valve body or other pressure vessel with which the novel jacket may be used.

A further important object is to provide for a combined jacket and connecting means preferably made in two or more sections and formed suitably weldable, so that a strong and yet relatively flexible structure may be provided to withstand such pipe line strains as may be encountered during the normal course of service.

Another object is to provide for a jacket construction in which the latter may be of substantially spherical form in its ultimate assembly, and thereby contribute the well-known characteristics of strength inherent to a sphere structure. While the application, as shown, shows the use of a jacket applied to a valve member, it will, of course, be appreciated that this invention is sufficiently flexible in its application, so that it may be used with other forms of pressure vessels; such as tanks or such fittings as tees and crosses, as desired.

Other objects and advantages will become more readily apparent upon proceeding with the specification read in light of the accompanying drawings, in which Fig. 1 is a fragmentary sectional assembly view showing a preferred embodiment of my invention applied to a valve.

Fig. 2 is a sectional view taken on the line 2—2 of Fig. 1.

Fig. 3 is a fragmentary sectional view of a modified form of the invention.

Fig. 4 is a fragmentary sectional view of a further modified embodiment.

Similar reference numerals refer to similar parts throughout the several views.

Referring now to Fig. 1, a conventional valve body, generally designated 1, is shown which may be either of the gate type as illustrated, or it may be a globe angle or cross valve, if desired. The valve body is provided with the usual connecting ends 2 normally used for attachment to a pipe line, the ends 2 forming the limits of the hub 3 of the valve body.

For purpose of illustrating the use of the invention, let it be assumed that it is the desire to heat or to cool the contents of the pipe line, particularly insofar as the area or location is concerned with which line products pass through a control valve. A suitable jacket is provided for the purpose which in the instant contribution consists preferably of two substantially semi-spherical halves, generally designated 4, and being joined on the central axis or median line by means of the weld 5, which continues upwardly as indicated to form the annular neck portion 6, fitting around the bonnet or upper end 7 of the valve body. Each half portion 8 is provided with the desired connecting ends 9 for suitable flanged connection with a pipe line, and while the flanges 9 are indicated as constituting one form of connection, it should, of course, be appreciated that other forms of attachment may be employed without changing the character of the jacket. Thus, welding ends, solder ends, and screw connections may be employed with equally good results.

In order to receive the end portions 2 of the hubs 3 of the valve body 1, the jacket halves 8 are recessed, as at 11, to receive relatively snugly, as indicated, the projecting hub portions shouldering, as at 12, and having the interior annularly chamfered, as at 13, to receive the weld 14 for attachment of the body ends to the halves 8, in addition to the joinder, effected by means of the line welds 5 and 6 at the central and neck portions respectively of the assembled halves 8. Thus, it will be apparent that each half forms a semi-spherical structure which when assembled upon the valve produces a hollow sphere about the valve body or other vessel, forming a circulating chamber 15 for the movement of desired heating or cooling fluids employed. To provide for the latter fluid circulation, each half 8 is preferably provided with the respective complementary bosses 16 and 17 which when joined together are tapped or otherwise finished to provide for a suitable connection, as at 18 and 19, respectively, serving as the inlet and the outlet, or vice versa, for the introduction and discharge of the circulating fluids. Thus, it will be apparent that by means of the attachment of the respective halves to the valve body, as illustrated by means of the weld 6, and the attachment to each other by means of the weld 5, and by further employing the independent end connections 9, the pipe line load structurally is independently provided and is removed from the valve body 1. This provision is desirable in order that such a valve body is not directly and adversely affected by contractual or expansion strains traceable to the pipe line in the course of normal service.

Other portions of the valve body, as illustrated, are conventional, the body being provided with the connecting upper bonnet flange 21 attached to the bonnet 22 by means of the usual bolts and studs 23 and having the gland flange 24 provided with the studs 25 for compressing the stuffing-box packing (not shown). A conventional yoke 26 is used, having the normal split hub 27 connected by means of the bolts 28 and having the stem rotatably operated by means of the handwheel 29, the latter being secured to the stem 31 by means of the handwheel nut 32. As shown in the broken-away portion of Fig. 1, the port 33 of the valve body is in communication with the port 34 of the respective halves 8, forming the completed jacket. Thus, it should be clear that a comparatively easy method has been provided whereby an effective strain-free attachment of a jacket is provided for a pressure vessel for suitable connection to a pipe line.

Referring now to the modified form of jacket construction shown in Fig. 3, the valve body similarly is of the conventional type described in connection with Fig. 1. However, instead of employing the flanges 9, the halves 8 are provided with the welding ends 35 suitably chamfered as at 36 to receive the welding flanges indicated. In this construction, the relatively large and frequently heavy end flanges 9 are dispensed with. Instead, a relatively lightweight construction may be used effectively for attachment to a pipe line, and yet at the same time possesses the advantages described in connection with the heavier end flange construction of Figs. 1 and 2.

As shown more clearly in Fig. 4 in a further modified construction, it may be desirable under certain conditions of construction to provide for a valve jacket in which the body 37, as shown in Fig. 4, is provided with the welding ends 38 which project directly through the spherical halves 39 of the modified jacket, designated 41. In the instant modification, the weld is made annularly, as at 6, extending outwardly around the neck of the body. However, it is supplemented by the exterior annular weld 42 applied in sealed relation around the end welding hub 37 of the valve body, generally designated 1.

It should, of course, be apparent that while a preferred embodiment and two modifications thereof have been described, other forms may be used without departing from the spirit of the invention or the scope of the appended claims.

I claim:

1. In a jacketed pressure vessel, the combination of an inner casing and an outer casing, the said outer casing providing a pair of axially aligned hollow sections, each of the said hollow sections having outer edge portions attached to end annular surfaces of the said inner casing, the said hollow sections having upper annular edges of semi-circular form, connections formed between said annular edges and a neck portion of the said inner casing, whereby a hollow fluid chamber is formed between the said inner casing and the said sections forming the outer casing, the said outer edge portions having inner recessed portions receiving the end annular surfaces of the said inner casing, and pipe line connection means on end portions of the said hollow sections beyond said annular surfaces.

2. In a jacketed pressure vessel, the combination of an inner casing and an outer casing, the said outer casing providing a plurality of substantially symmetrical semi-spherical sections to form said casing, the outer casing when assembled having an inlet and an outlet, each section having a complementary edge portion for annular attachment to a neck portion of the said inner casing, the said sections having perimetrically extending adjoining edges substantially on the centerline of both casings and forming a connection between said sections in spaced-apart relation to the outer surface of the said inner casing, thereby to form a fluid circulating chamber communicating with the said inlet and outlet of the said sections forming the said outer casing, each of said sections having oppositely disposed recesses shouldered to receive oppositely disposed end limits of the inner casing for alignment and attachment with the outer casing.

3. In a jacketed valve body or the like vessel, the combination including an inner casing and an outer casing, the latter casing consisting of at least a pair of symmetrical hollow members connected at substantially adjoining edges in different planes and enclosing in chambered relation thereto the said inner casing, each of the said hollow members having end apertured portions and an annular portion for fluid sealing attachment to a neck portion of said inner casing, the said outer casing being also joined to the said inner casing by end positioned annular welds, the inner casing being supported and maintained in spaced-apart fluid sealing relation to said end apertured portions of the said hollow members and having pipe line end connecting portions extending beyond the end positioned annular welds of the said hollow members, and at least one of said annular portions cooperating with said neck portion to define the axial spaced-apart relation of the adjoining edges before a weld connection or the like is made therebetween.

JOHN A. McINERNEY.

References Cited in the file of this patent
UNITED STATES PATENTS

| Number | Name | Date |
|---|---|---|
| 880,569 | Peulecke | Mar. 3, 1908 |
| 905,745 | Orr | Dec. 1, 1908 |
| 2,023,915 | Connell | Dec. 10, 1935 |
| 2,114,145 | Kane | Apr. 12, 1938 |
| 2,118,388 | Zerbe | May 24, 1938 |
| 2,363,943 | Carlson | Nov. 28, 1944 |

FOREIGN PATENTS

| Number | Country | Date |
|---|---|---|
| 631,762 | Germany | of 1936 |